United States Patent [19]
Bronicki

[11] Patent Number: 5,628,190
[45] Date of Patent: May 13, 1997

[54] GEOTHERMAL POWER PLANT AND CONDENSER THEREFOR

[75] Inventor: Lucien Y. Bronicki, Yavne, Israel

[73] Assignee: Ormat Industries Ltd., Yavne, Israel

[21] Appl. No.: 317,637

[22] Filed: Oct. 3, 1994

[51] Int. Cl.$^6$ ............................................. F03G 7/00
[52] U.S. Cl. ............................................. 60/641.2
[58] Field of Search ........................... 60/641.2; 165/900

[56] References Cited

U.S. PATENT DOCUMENTS

| | | | |
|---|---|---|---|
| 4,542,625 | 9/1985 | Bronicki | 60/641.2 |
| 4,576,006 | 3/1986 | Yamaoka | 60/641.2 |
| 4,967,559 | 11/1990 | Johnston | 60/641.2 |
| 4,996,846 | 3/1991 | Bronicki | 60/641.2 |
| 5,032,284 | 7/1991 | Gallup et al. | 60/641.2 |

*Primary Examiner*—Ira S. Lazarus
*Assistant Examiner*—Alfred Basichas
*Attorney, Agent, or Firm*—Donald M. Sandler

[57] ABSTRACT

A geothermal power plant operating on geothermal fluid includes a source of low pressure geothermal steam, and a turbo-generator including a low pressure steam turbine to which the geothermal steam is applied, and a generator coupled to the steam turbine. The low pressure geothermal steam is applied to the turbine, wherein expansion takes place driving the generator, and producing expanded steam that is exhausted from the turbine. A condenser for condensing the expanded steam includes a steam heat exchanger for receiving the expanded steam, a coolant, an air cooled heat exchanger, and a pump to exchange coolant during the steam heat exchanger and the air cooled heat exchanger, in a closed secondary coolant cycle. Preferably, the coolant is water.

16 Claims, 1 Drawing Sheet

GEOTHERMAL POWER PLANT AND CONDENSER THEREFOR

TECHNICAL FIELD

This invention relates to geothermal power plants and to an improved condenser therefor.

BACKGROUND

Producing power from geothermal heat sources currently is being carried out on a wide scale throughout the world. In many installations, hot geothermal fluid extracted from a production well is flashed into steam in a separator that produces geothermal steam rich in non-condensable gases, such as hydrogen sulfide, carbon dioxide, etc. The brine that remains is sometimes so corrosive, and sometimes contains such a high concentration of silica, that from an engineering standpoint, it must be disposed of in a re-injection well without using a significant amount of heat contained therein.

The geothermal steam produced from the separator is applied to a steam turbine coupled to a generator, the steam expanding in the turbine and driving the generator which produces electricity. Condensing expanded steam in the turbine exhaust is often a problem when an inadequate supply of ambient cooling water is available. Usually, the expanded steam contains noxious gases which, for environmental reasons, precludes the use of an open system condenser, such as cooling towers, for condensing the steam even when ambient water is available. Under such conditions, chemical pre-treatment of the exhaust steam is usually required to suppress escape of the non-condensable gases. This is an expensive, and complex, solution to the problem.

It is therefore an object of the present invention to provide a geothermal power plant and a condenser therefor which is capable of operating without significant amounts of ambient cooling water, and which avoids the problems described above.

BRIEF DESCRIPTION OF THE INVENTION

A geothermal power plant operating on geothermal fluid according to the present invention includes a source of low pressure geothermal steam, and a turbo-generator including a low pressure steam turbine to which the geothermal steam is applied, and a generator coupled to the steam turbine. The low pressure geothermal steam is applied to the turbine wherein expansion takes place driving the generator and producing expanded steam that is exhausted from the turbine. A condenser for condensing the expanded steam includes a steam heat exchanger for receiving the expanded steam, a coolant, an air-cooled heat exchanger, and a pump to exchange coolant between the steam heat exchanger and the air-cooled heat exchanger in a closed, secondary coolant cycle. Such condenser is ideally suited for installations where an adequate supply of ambient cooling water is not available.

Preferably, the coolant is water to which anti-freeze may be added selectively during winter operation to prevent freezing of the coolant. Also preferably, non-condensable gases are removed to prevent these gases from affecting the efficiency of the operation of the steam heat exchanger in the secondary coolant cycle.

When the geothermal fluid that supplies the source of low pressure geothermal steam is derived from a low pressure geothermal production well, the source of low pressure geothermal steam may include a separator for receiving geothermal fluid from the low pressure production well, and separating the fluid into brine and low pressure geothermal steam. In such case, non-condensable gases in the steam may be removed from the steam heat exchanger thus improving the heat transfer characteristics of the condenser.

When the geothermal fluid that supplies the source of low pressure geothermal steam is derived from a production well at a pressure higher than the low pressure well described above, the source of geothermal steam may include a separator for receiving geothermal fluid from the production well, and separating the fluid into brine and higher pressure steam. In this case, however, the source of low pressure steam comprises a primary turbo-generator that includes a steam turbine coupled to a generator. The higher pressure steam is applied to the steam turbine of the primary turbo-generator wherein the steam expands driving the generator and producing primary exhaust steam. A primary heat exchanger receives the brine, which, in cooperation with the primary exhaust steam, establishes the source of low pressure geothermal steam.

When the production well produces intermediate pressure geothermal fluid, the primary heat exchanger may be an indirect contact re-heater having two sides, one that receives the brine, and the other that receives the primary exhaust steam from the turbine of the primary turbo-generator. The re-heater reheats the primary exhaust steam to form the low pressure geothermal steam.

When the production well produces geothermal fluid at a pressure higher than the intermediate pressure previously described, the primary heat exchanger may be in the form of a flash chamber for receiving brine from the separator and producing flashed steam which is combined with the primary exhaust steam from the steam turbine of the primary turbo-generator. In this case, the combination of primary steam exhausted from the turbine of the primary turbo-generator with the steam flashed from the brine forms the low pressure geothermal steam.

When high pressure geothermal fluid is produced by the production well, the turbo-generator that operates on low pressure geothermal steam can be combined with the primary turbo-generator by utilizing a multi-stage steam turbine. In such case, the input stage of the turbine would constitute the intermediate, or the high pressure stage, as the case may be, as described above, and the following stage of the turbine would constitute the low pressure stage described above.

BRIEF DESCRIPTION OF THE DRAWINGS

Embodiments of the present invention are described below and shown by way of example in the accompanying drawings, wherein.

DETAILED DESCRIPTION

Figure 1:
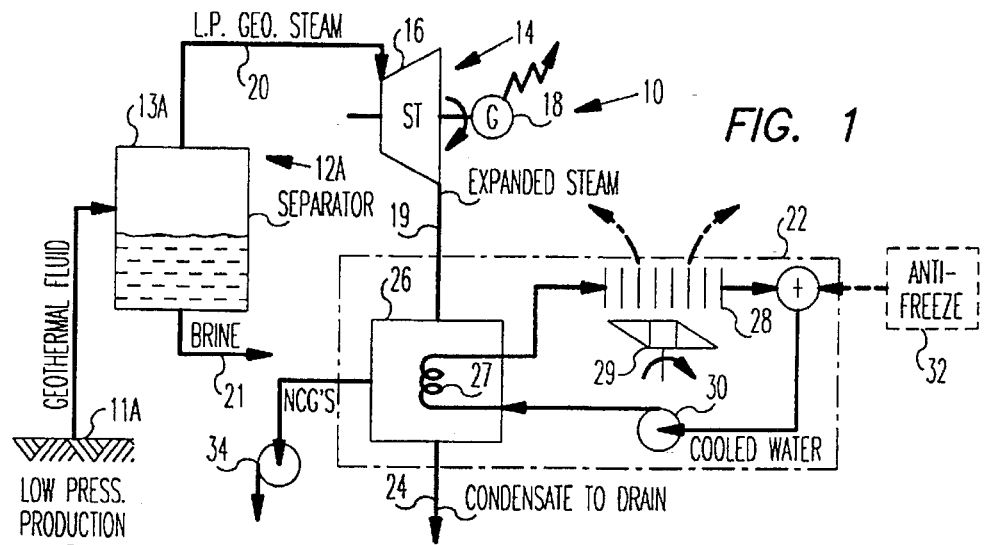
FIG. 1 is a block diagram of a geothermal power plant according to the present invention for utilizing geothermal fluid produced by a low pressure production well.

Referring now to the drawings, reference numeral 10 designates a power plant according to the present invention for generating power from geothermal fluid produced by low pressure production well 11A. Typically, a well that produces geothermal fluid which, after separation into brine and steam that have a temperature of about 160° C., is referred to as a low pressure well.

Power plant 10 comprises source 12A of low pressure geothermal steam, and turbo-generator 14 which includes low pressure steam turbine 16 coupled to generator 18. Source 12A includes separator 13A that receives low pressure geothermal fluid from well 11A and separates the fluid into a vapor stream, and a liquid stream. The vapor stream that exits into conduit 20 constitutes the low pressure geothermal steam, and the liquid steam that exits into conduit 21 is constituted by brine. Conduit 20 connected to source 12 applies the low pressure geothermal steam to the turbine wherein expansion of the steam takes place driving generator 18 which produces electricity, and producing expanded steam in exhaust line 19.

Condenser 22 connected to exhaust line 19 receives expanded steam exhausted from turbine 16 and condenses the steam producing condensate in drain line 24. Condenser 22 includes steam heat exchanger 26 for receiving the expanded steam, a coolant, air-cooled heat exchanger 28, and pump 30. Operation of pump 30 causes the exchange of coolant between steam heat exchanger 26 and air-cooled heat exchanger 28 in a closed loop.

Preferably the coolant is water and source 32 of anti-freeze may be provided by which anti-freeze is selectively added to the coolant as needed under winter conditions to prevent freezing of the coolant. Preferably, compressor 34 is connected to steam heat exchanger 26 for the purpose of removing non-condensable gases from the steam heat exchanger, and pressurizing the gases for environmentally safe disposal in a re-injection well (not shown).

In operation, conduit 20 carries steam from source 12A to the input of steam turbine 16, thereby constituting means for applying steam from the source to the turbine. Expansion of the steam takes place in the turbine driving generator 18 which produces electricity, and producing expanded steam that is applied to heat exchanger 26 within which are located a plurality of tubes 27 containing coolant, preferably water. Pump 30 exchanges the coolant between tubes 27 and finned heat exchanger 28 which is cooled with ambient air by operation of fan 29. The coolant is thus in a closed loop which permits the coolant, if it is water, to be treated to maximize heat transfer. The removal of non-condensable gases from the condenser also contributes to the effectiveness of the condenser. Finally, tubes 27 are preferably of stainless steel to preclude damage by contact with the expanded geothermal steam.

Figure 2:
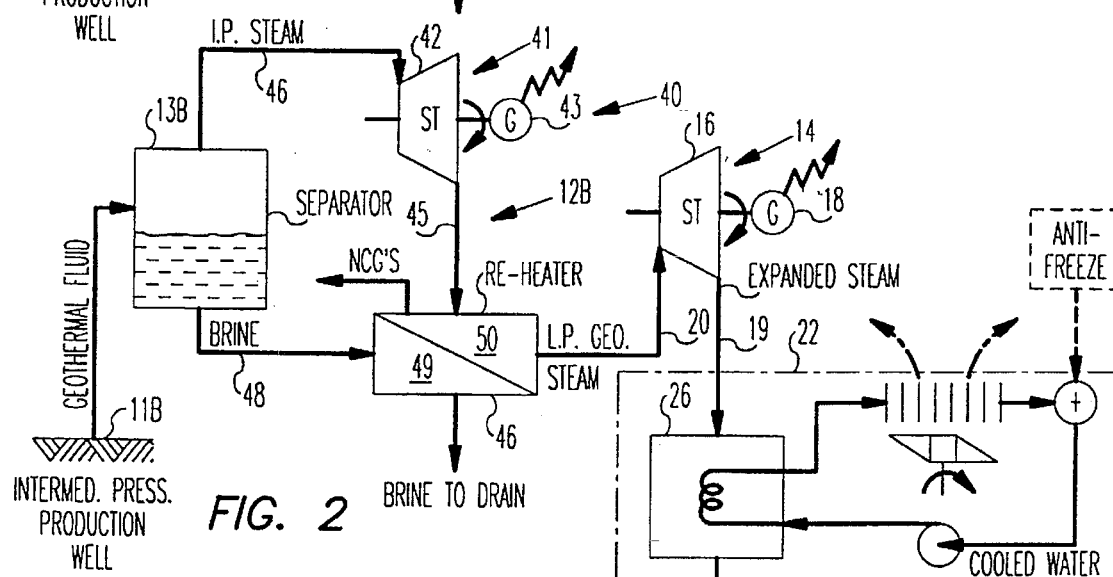
FIG. 2 is a block diagram of a geothermal power plant according to the present invention for utilizing geothermal fluid produced by an intermediate pressure production well.
Figure 3:
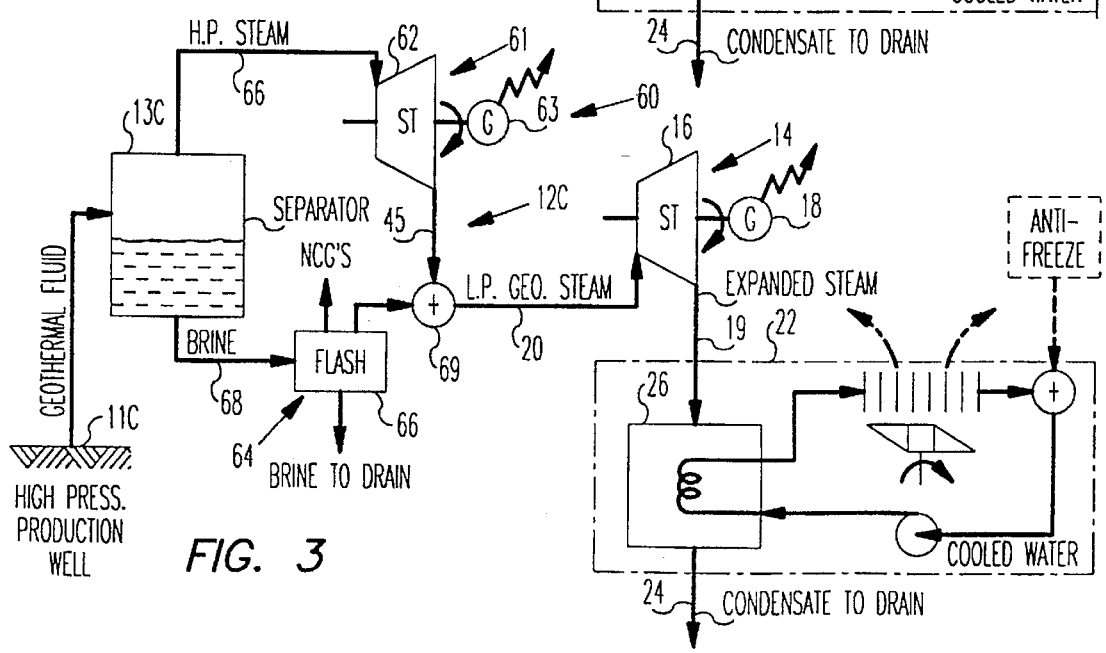
FIG. 3 is a block diagram of a geothermal power plant according to the present invention for utilizing geothermal fluid produced by a high pressure production well.

In some fields, production wells produce higher pressure geothermal fluid. Typically, a well that produces geothermal fluid which, after separation into brine and steam that have a temperature in the range of about 130°-140° C., is referred to as an intermediate pressure well. A well that produces geothermal fluid at a higher pressure is referred to as a high pressure well. The invention is also applicable to both types of wells. Power plant 40 shown in FIG. 2 is the preferred design for geothermal fluid of intermediate pressure produced by production well 11B; and power plant 60 shown in FIG. 3 is the preferred design for geothermal fluid of high pressure produced by production well 11C.

Power plant 40 comprises source 12B of low pressure geothermal steam (i.e., steam derived from geothermal fluid, and having a temperature of about 120° C.), and turbo-generator 14 which includes low pressure steam turbine 16 coupled to generator 18. Conduit 20 supplies the low pressure steam to turbine 16 wherein the steam is expanded driving the attached generator and producing exhaust steam in conduit 19 that is condensed in condenser 22 as described above. In this embodiment of the invention, like reference numerals designate like components in the other embodiments.

Source 12B includes separator 13B, turbo-generator 41 that includes primary steam turbine 42 coupled to generator 43, and primary heat exchanger 44. Separator 13B receives intermediate pressure geothermal fluid from well 11B and separates the fluid into two streams, one containing steam that exits into conduit 46, and the other containing brine that exits into conduit 48.

Conduit 46 applies intermediate pressure geothermal steam from separator 13B to the primary steam turbine (which, in this case, is an intermediate pressure steam turbine) wherein expansion of the steam takes place driving generator 43 which produces electricity, and producing primary expanded steam in exhaust line 45. Primary heat exchanger 44 receives the primary exhaust steam via conduit 45, and brine via conduit 48, and produces low pressure geothermal steam that exits via conduit 20.

In power plant 40, which utilizes intermediate pressure geothermal steam produced by the separator, primary heat exchanger 44 is constituted by indirect contact reheater 46 having a heat transfer surface 47 that divides the heat exchanger into sides 49 and 50. Side 49 receives brine from the separator; and side 50 receives primary expanded steam exhausted from the primary turbine. Heat in the brine is transferred through surface 47 to the the primary exhaust steam thus reheating the steam which exits via conduit 20 and constitutes low pressure geothermal steam described above. This low pressure geothermal steam is applied to low pressure turbine 16 of turbo-generator 14 whose operation is the same as that described above.

In this embodiment of the invention, non-condensable gases are preferably removed from side 50 of reheater 46 to enhance the heat transfer characteristics of the reheater.

Power plant 60 comprises source 12C of low pressure geothermal steam, and turbo-generator 14 which includes low pressure steam turbine 16 coupled to generator 18. Conduit 20 supplies the low pressure steam to turbine 16 wherein the steam is expanded driving the attached generator and producing exhaust steam in conduit 19 that is condensed in condenser 22 as described above. In this embodiment of the invention, like reference numerals designate like components in the other embodiments.

Source 12C includes separator 13C, turbo-generator 61 that includes primary steam turbine 62 coupled to generator 63, and primary heat exchanger 64. Separator 13C receives high pressure geothermal fluid from well 11C and separates the fluid into two streams, one containing steam that exits into conduit 66, and the other containing brine that exits into conduit 68.

Conduit 66 applies high pressure geothermal steam from separator 13C to the primary steam turbine (which, in this case, is a high pressure steam turbine) wherein expansion of the steam takes place driving generator 63 which produces electricity, and producing primary expanded steam in exhaust line 65. Primary heat exchanger 64 receives the primary exhaust steam via conduit 65, and brine via conduit 68, and produces low pressure geothermal steam that exits via conduit 20.

In power plant 60, which utilizes high pressure geothermal steam produced by the separator, primary heat exchanger 64 is constituted by flash chamber 66 for receiving brine conduit 68 and producing flashed steam at a temperature higher than the temperature of the primary expanded steam in conduit 65. The flashed steam exits chamber 65 in conduit 67 and is combined at 69 with the primary expanded steam. The combination constitutes low pressure geothermal steam in conduit 20 described above. This low pressure geothermal steam is applied to low pressure turbine 16 of turbo-generator 14 whose operation is the same as that described above.

In this embodiment of the invention, non-condensable gases are preferably removed from chamber 66 to enhance the heat transfer characteristics of condenser 22.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A geothermal power plant operating on geothermal fluid comprising:
   (a) a source of low pressure geothermal steam derived from said fluid;
   (b) a turbo-generator including a low pressure steam turbine coupled to a generator;
   (c) means for applying steam from said source to said turbine wherein expansion of the steam takes place driving the generator which produces electricity, and producing expanded steam;
   (d) a condenser for condensing said expanded steam; and
   (e) said condenser including a steam heat exchanger for receiving said expanded steam, a coolant in the form of water, an indirect-contact air-cooled heat exchanger, and a pump operable to effect the exchange of coolant between said steam heat exchanger and said air cooled heat exchanger in a closed coolant loop.

2. A geothermal power plant according to claim 1 wherein said low pressure geothermal steam contains non-condensable gases, and including means for removing said non-condensable gases from said condenser.

3. A geothermal power plant according to claim 1, wherein said geothermal fluid includes non-condensable gases, and including means for removing non-condensable gases.

4. A geothermal power plant according to claim 3 wherein said means for removing non-condensable gases is effective to remove said gases from said low pressure steam before it is applied to said turbine.

5. A geothermal power plant according to claim 1, wherein said source of geothermal steam includes a separator for receiving geothermal fluid and separating the fluid into steam and brine, said low pressure geothermal steam being derived from said steam.

6. A geothermal power plant according to claim 5, wherein said low pressure geothermal steam includes non-condensable gases, including means for removing non-condensable gases from said condenser.

7. A geothermal power plant according to claim 1, wherein said source of said low pressure geothermal steam includes:
   (a) a separator for receiving said geothermal fluid and separating the fluid into two streams, one stream containing steam, and the other stream containing brine;
   (b) a primary turbo-generator that includes a steam turbine coupled to a generator;
   (c) means for applying said steam from said one stream to the steam turbine of said primary turbo-generator, expansion of steam in the last mentioned steam turbine driving said generator which produces electricity, and producing primary exhaust steam; and
   (d) a primary heat exchanger for receiving said primary exhaust steam and brine from said other stream and wherein said primary exhaust steam is heated by said brine stream to produce said low pressure geothermal steam.

8. A geothermal power plant according to claim 7, wherein said primary heat exchanger is an indirect contact reheater having two sides, one for receiving said brine, and the other side for receiving said primary exhaust steam which is reheated to form said low pressure geothermal steam.

9. A geothermal power plant according to claim 8, including means for removing non-condensable gases from the side of the reheater receiving said exhaust steam.

10. A geothermal power plant according to claim 7, wherein said primary heat exchanger is a flash chamber for receiving brine from said other stream and producing flashed steam that is combined with said primary exhaust steam forming said geothermal steam.

11. A geothermal power plant according to claim 1, wherein said source of geothermal steam includes a separator for receiving geothermal fluid and separating the fluid into steam and brine.

12. A geothermal power plant operating on geothermal fluid comprising:
   (a) a source of geothermal steam derived from said fluid;
   (b) a turbo-generator including a steam turbine coupled to a generator, said turbo-generator being responsive to said steam for producing electricity and expanded steam;
   (c) a condenser for condensing said expanded steam; and
   (d) said condenser including a steam heat exchanger for receiving said expanded steam, an indirect-contact air-cooled heat exchanger containing a coolant in the form of water, and a pump operable to effect the exchange of coolant between said steam heat exchanger and said air cooled heat exchanger in a closed coolant loop.

13. A geothermal power plant according to claim 12 wherein said geothermal steam contains non-condensable gases, and including means for removing said non-condensable gases.

14. A condenser comprising:
   a) a source of expanded steam; and
   b) a steam heat exchanger for receiving said expanded steam;
   c) an indirect-contact air-cooled heat exchanger containing a coolant in the form of water; and
   d) a pump operable to effect the exchange of coolant between said steam heat exchanger and said air cooled heat exchanger in a closed coolant loop.

15. Apparatus in combination with the condenser of claim 14 including a steam turbine operating on low pressure steam for producing said expanded steam.

16. A geothermal power plant operating on geothermal fluid comprising:
   (a) a source of low pressure geothermal steam derived form said fluid;
   (b) a turbo-generator including a low pressure steam turbine coupled to a generator;
   (c) means for applying steam from said source to said turbine wherein expansion of the steam takes place driving the generator which produces electricity, and producing expanded steam;

(d) a condenser for condensing said expanded steam; and (e) said condenser including a steam heat exchanger for receiving said expanded steam, water coolant, an air-cooled heat exchanger, and a pump operable to effect the exchange of coolant between said steam heat exchanger and said air cooled heat exchanger in a closed loop; and (f) means for selectively adding anti-freeze to said coolant.

* * * * *